United States Patent [19]
Sykora

[11] 3,819,226
[45] June 25, 1974

[54] ATTACHMENT ASSEMBLY FOR SNOWMOBILE WINDSHIELD

[75] Inventor: Hans Werner Sykora, Drummondville, Quebec, Canada

[73] Assignee: The Coleman Company, Inc., Wichita, Kans.

[22] Filed: Oct. 10, 1972

[21] Appl. No.: 296,328

[52] U.S. Cl............... 296/90, 180/5 R, 296/78 R
[51] Int. Cl............................................. B60j 1/02
[58] Field of Search..... 296/84 R, 84 K, 84 N, 78.1, 296/78 R, 90, 89; 180/5 R; 160/368 R; 52/502

[56] References Cited
UNITED STATES PATENTS

| | | | |
|---|---|---|---|
| 1,266,217 | 5/1918 | Curran | 296/89 |
| 2,224,186 | 12/1940 | Henri-Labourdette | 296/84 R |
| 2,770,296 | 11/1956 | Bond | 160/173 |
| 3,331,427 | 7/1967 | Colombo | 160/206 |
| 3,622,196 | 11/1971 | Sarra | 296/90 |
| 3,630,812 | 12/1971 | Bruckner et al. | 296/84 K X |

FOREIGN PATENTS OR APPLICATIONS

| | | | |
|---|---|---|---|
| 541,754 | 5/1922 | France | 296/90 |

*Primary Examiner*—Robert G. Sheridan
*Assistant Examiner*—Leslie J. Paperner

[57] ABSTRACT

A snowmobile is provided with a windshield attachment assembly which permits the windshield to be releasably snapped into place. The cowl of the snowmobile is provided with a V-shaped groove and a plurality of slots which extend through the groove. A lug retainer or keeper extends away from the lower surface of the cowl below each of the slots, and each lug retainer includes a camming surface extending away from the cowl and a lug retaining surface. The windshield includes a plurality of generally planar lugs which extend downwardly from the bottom edge of the windshield, and each of the lugs is provided with an opening therethrough. The windshield is attached by inserting each of the lugs through one of the slots in the cowl, and as each lug extends through the slot, it is cammed away from the lower surface of the cowl by the lug retainer until the lug retainer passes through the opening in the lug. The lug then snaps back into its original position, and the bottom edge of the opening is positioned below the retaining surface of the lug retainer to prevent withdrawal of the lug from the slot. When the windshield is to be removed, each lug can be successively flexed away from the lug retainer to permit upward movement of the lug past the lug retaining surface. If desired, each lug can be provided with a reduced lateral dimension and adjacent the bottom edge of the windshield to permit the windshield to break away from the cowl under a predetermined impact in the event of a crash. The lugs will fracture preferentially across the reduced lateral portions when a forward force is applied to the windshield.

7 Claims, 7 Drawing Figures

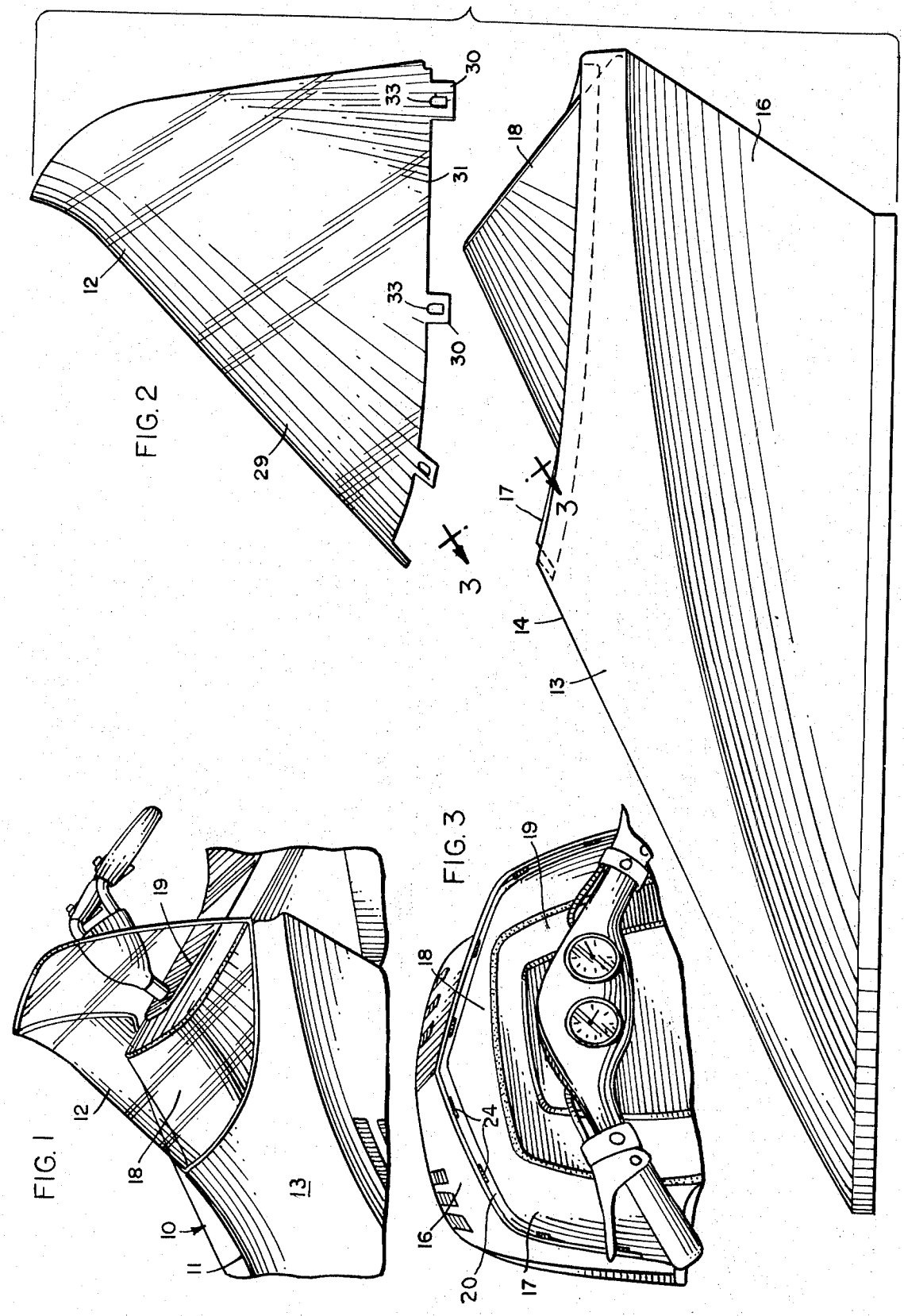

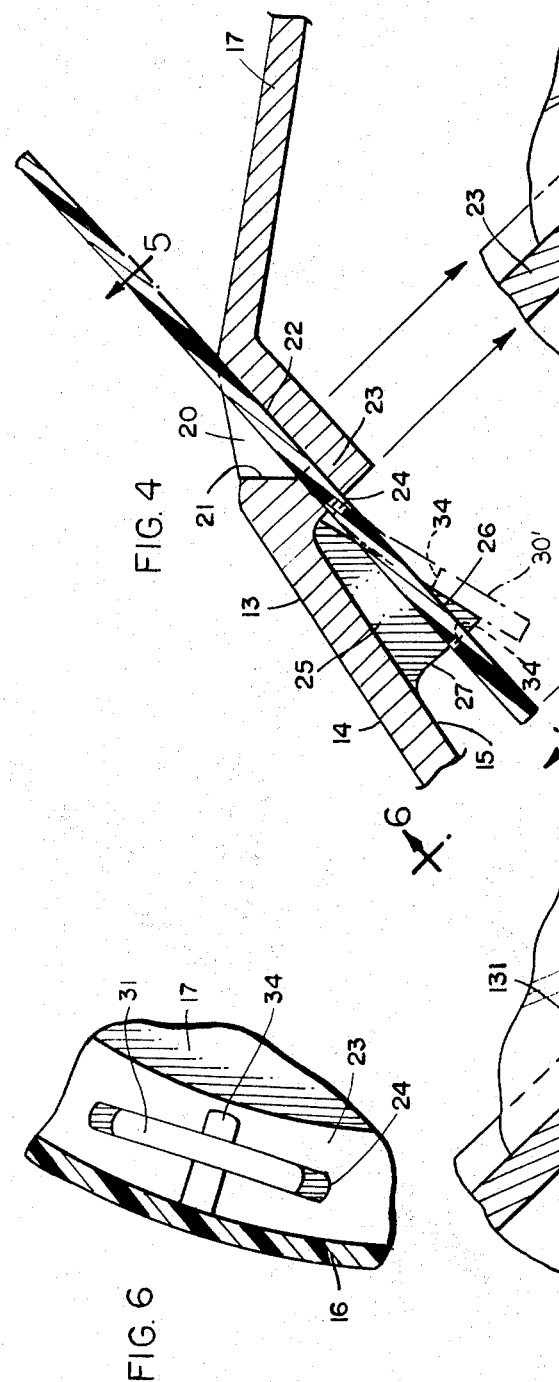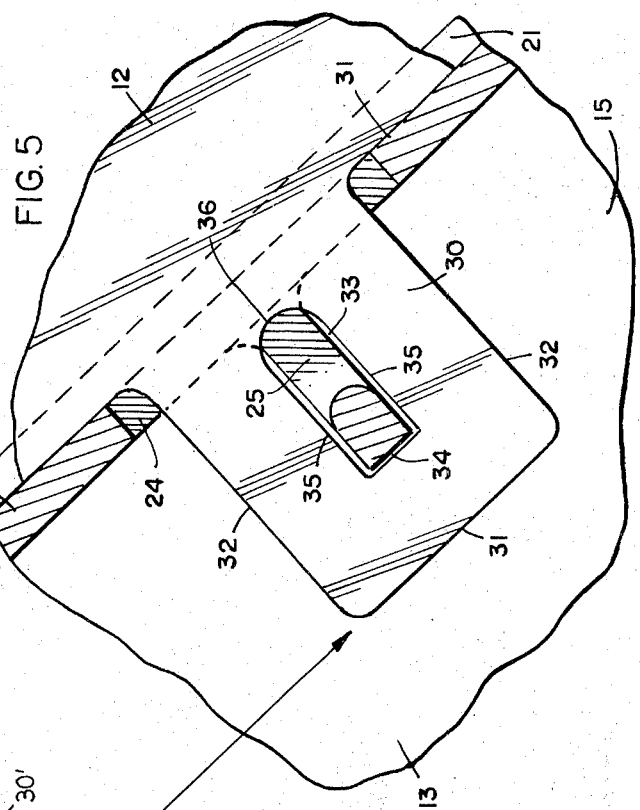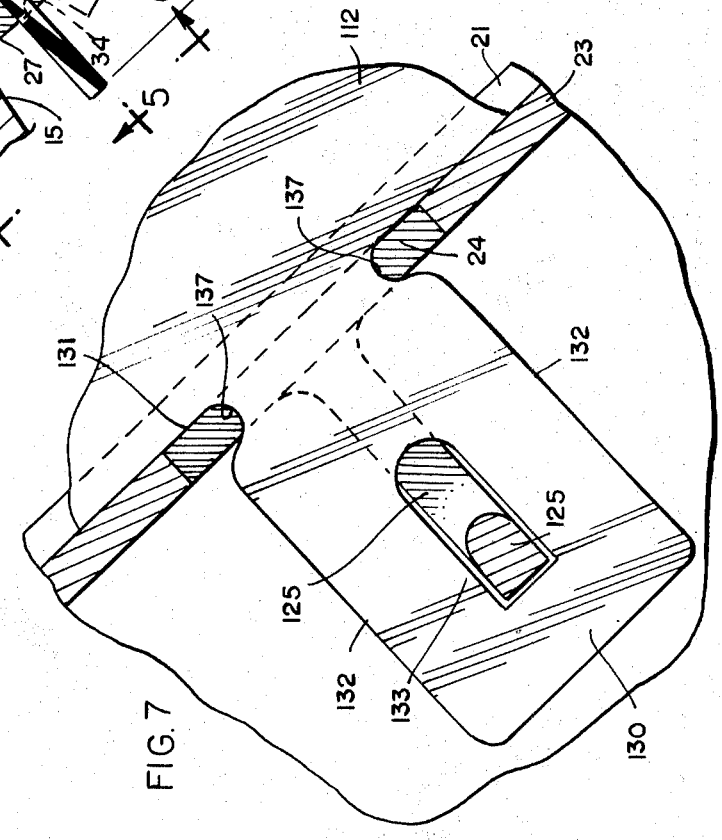

ATTACHMENT ASSEMBLY FOR SNOWMOBILE WINDSHIELD

BACKGROUND

This invention relates to snowmobiles, and, more particularly, to an attachement assembly for a snowmobile windshield.

Snowmobiles conventionally include a molded plastic cabin and a molded plastic windshield. The windshield is usually attached to the cowl or hood portion of the cabin by separate fastening means, and the installation and removal of the windshield is thereby rendered relatively difficult. Because of packaging and shipping considerations, snowmobiles are generally shipped from the factory without the windshield attached. This results in added costs for both the factory and the dealer. The factory must include separate fastening means, and the dealer must incur additional preparation costs in attaching the windshield.

If the snowmobile is involved in an accident, the windshield may require replacement. If the windshield is relatively permanently attached, the snowmobiles may have to be returned to the dealer for servicing. Further, the windshield may be attached in such a way that it does not yield under substantial impact, and this presents a hazard to the operator.

SUMMARY

The invention provides for snap-in installation of the windshield which eliminates the need for separate fasteners. The windshield is installed simply by pushing the lugs of the windshield through the slots in the cowl until the openings in the lugs pass below the lug retainers. The lugs will then snap into place below the retaining surfaces of the retainers to prevent withdrawal of the lugs from the slots. The windshield can be installed quickly and easily by either the dealer or the customer, and the snowmobile and the windshield can therefore be shipped by the manufacturer without having the windshield attached. The snap-in installation eliminates the cost of separate fasteners and eliminates the labor cost of installing the windshield. The windshield cooperates with the groove in the cowl to provide a smooth, clean transition between the cowl and the windshield which conceals the bottom edge of the windshield and the fastening means. The windshield is integrally molded from flexible, resilient plastic, and the windshield can be quickly removed for replacement by flexing each lug consecutively away from the associated lug retainer to permit withdrawal of the lug from the slot. If desired, the width of the lug can be reduced adjacent the bottom edge of the windshield to permit the windshield to break away under a predetermined impact force from the operator's side in the event of an accident.

DESCRIPTION OF THE DRAWING

The invention will be explained in conjunction with an illustrative embodiment shown in the accompanying drawing, in which FIG. 1 is a fragmentary perspective view of a snowmobile equipped with the invention;

FIG. 2 is an exploded fragmentary side elevational view of the snowmobile;

FIG. 3 is a fragmentary sectional view taken along the line 3—3 of FIG. 2;

FIG. 4 is a fragmentary sectional view showing the windshield attached to one of the lug retainers;

FIG. 5 is a fragmentary sectional view taken along the line 5—5 of FIG. 4;

FIG. 6 is a fragmentary sectional view taken along the line 6—6 of FIG. 4; and

FIG. 7 is a view similar to FIG. 5 showing a modified form of the invention.

DESCRIPTION OF THE SPECIFIC EMBODIMENT

Referring now to FIGS. 1 and 2, the numeral 10 designates generally a snowmobile having a cabin 11 and a windshield 12. The cabin includes a cowl or hood 13 which may be molded from plastic and which is hingedly secured to the frame of the snowmobile in the conventional manner to permit access to the motor below the cowl.

The cowl has an upper or forward surface 14 and a lower or rearward surface 15 (FIG. 4) and includes a lower portion 16 which extends upwardly from the snowmobile frame and which forms the sides and front of the cowl, an intermediate portion 17 (FIGS. 3 and 4) which extends inwardly from the windshield, and an inner portion 18 which extends upwardly from the intermediate portion and which supports the dash 19 of the snowmobile.

A generally V-shaped groove 20 is provided in the cowl between the lower portion 16 and the intermediate portion 17. The groove is defined by angularly related front and rear walls 21 and 22, respectively, and a bottom wall 23. A plurality of elongated slots 24 are provided through the bottom wall 23 at spaced locations along the length of the groove. A generally triangularly shaped lug retainer or keeper 25 extends away from the lower surface of the cowl below each slot 24 and is generally aligned with the middle of the slot. Each of the triangularly shaped retainers includes a camming surface 26 which is angularly related to the plane of the slot and a retaining surface 27 which extends substantially perpendicularly to the plane of the slot.

The windshield 12 includes a curved visor portion 29 which extends upwardly from the cowl to protect the operator and a plurality of lugs 30 which extend downwardly from the lower edge 31 of the windshield. The windshield is integrally molded from flexible, resilient plastic, and the contour of the lower edge 31 is substantially the same as the contour of the groove 20 in the cowl. Each of the lugs has a length slightly less than the length of the slot in the groove, and the lugs are spaced apart along the lower edge of the windshield a distance corresponding to the distance between the slots to permit the lugs to be inserted through the slots. Each of the lugs is substantially planar and rectangular, having a bottom edge 31 and a pair of side edges 32. A central opening 33 is provided through each lug and is defined by a straight bottom edge 34 having a length slightly greater than the thickness of the retainers 25, a pair of elongated side edges 35, and in the embodiment illustrated, a curved top edge 36.

As the lugs are inserted through the slots, the bottom edge of each lug engages the camming surface of the lug retainer below the slot, and the lugs are flexed away from the lower surface of the cowl as the lug moves along the camming surface as shown in dotted outline at 30 in FIG. 4. The width of each of the slots is just slightly greater than the thickness of the lugs, and the portion of the lug that is positioned within the slot is held against flexing by the edges of the slot. When each lug is lowered sufficiently, the associated lug retainer passes into the opening 33 of the lug and the resilient lug snaps back to its original position. The lower edge 34 of the opening will then be positioned below the retaining surface 27 of the lug retainer as shown in solid outline in FIG. 4, and each retainer serves as hook means to prevent the lug from being withdrawn from the slot.

The distance between the lower edge 34 of the opening and the lower edge 31 of the windshield is only slightly greater than the distance between the retaining surface 27 and the bottom of the groove 20 so that the windshield is firmly secured within the groove. The windshield is supported against forces exerted by the wind and the like by the relatively wide rear wall 22 of the groove which abuts a substantial portion of the rear surface of the windshield. The bottom edge of the windshield is positioned at the bottom of the groove in the cowl and is substantially hidden by the front wall 21 of the groove. A smooth, clean transition is thereby provided between the cowl and the windshield, and no fastening means for the windshield are visible from outside of the cowl.

After the windshield is inserted, the lugs remain in position below the retaining surfaces 27. Since the slots 24 are only slightly wider than the thickness of the windshield and the bottom wall 23 of the groove is relatively thick (being about twice the thickness of the windshield in the illustration given), pivoting movement of the lugs in the slots which might permit the lugs to be disengaged from the keepers is restrained.

When the windshield is to be removed for replacement or for shipment of the snowmobile, the lugs can be disengaged from the retainers merely by flexing each lug away from the cowl until the bottom edge of the opening in the lug has moved outwardly of the retaining surface. The retaining surfaces extend perpendicularly to the lugs, and each lug can be flexed successively and the windshield lifted slightly to prevent the lug from returning below the retainer. After all of the lugs have been disengaged from the retaining surfaces, the windshield can be lifted upwardly from the groove.

A modified form of the windshield is shown in FIG. 7. Windshield 112 includes lugs 130 which extend through slots 24 in the bottom wall 23 of the groove as hereinbefore described. However, the lateral dimension of the lugs 130 between the side edges 132 is reduced adjacent the bottom edge 131 of the windshield by laterally inwardly extending notches or cut-outs 137. The width of the windshield material between the notches is selected to permit controlled fracture of the windshield along a line between the notches when an impact force against the rear surface of the windshield exceeds a predetermined amount. As explained with reference to FIG. 4, the bottom wall of the groove restrains pivoting of the lugs in the slots, and the windshield will therefore bend adjacent the juncture between the lugs and the remainder of the windshield until fracture occurs. In the embodiment illustrated in FIG. 7, the retainers 125 on the cowl are positioned slightly below the position of the retainers 25 in FIG. 5, and the opening 133 in the lugs is positioned farther below the bottom edge 131 of the windshield than the opening 33 so that the minimum distance between the opening 133 and the notches 137 is less than the lateral dimension between the notches. This assures that fracture will occur between the notches rather than between one of the notches and the opening 133.

I have found that good results can be obtained by molding the windshield from clear polycarbonate plastic, which has good impact strength and retains its physical properties at low temperatures. A plastic sold under the trademark "Uves" is also suitable, although I believe that polycarbonate has superior physical properties at extremely low temperatures. The windshield may be die cut from plastic sheeting and thermoformed in a subsequent process to the desired contour.

While in the foregoing specification a detailed description of a specific embodiment of the invention has been set forth for the purpose of illustration, it is to be understood that many of the details hereingiven may be varied considerably by those skilled in the art without departing from the spirit and scope of the invention.

I claim:

1. In combination, a windshield and snowmobile cowl, the cowl having upper and lower surfaces and a plurality of spaced-apart slots extending therethrough, lug retaining means on the cowl below the upper surface thereof aligned with each of the slots, the windshield having front and rear surfaces and a bottom edge, a plurality of spaced-apart lugs extending downwardly from the bottom edge of the windshield, each of the lugs extending through one of the slots in the cowl and being releasably engaged with one of the lug retaining means whereby the windshield is releasably attached to the cowl, the lateral dimension of each lug being reduced adjacent the bottom edge of the windshield whereby the windshield will fracture preferentially at the laterally reduced portions of the lugs when the windshield is forced forwardly.

2. In combination, a windshield and snowmobile cowl, the cowl having upper and lower surfaces and a plurality of spaced-apart slots extending therethrough, hook means on the cowl extending from the lower surface thereof below each slot in the cowl, each hook means having a camming surface extending below the associated slot and away from the lower surface of the cowl and a retaining surface extending angularly from the camming surface, the windshield having front and rear surfaces and a plurality of spaced-apart downwardly extending lugs, each lug being generally planar and having an opening therethrough and being flexible relative to the remainder of the windshield, each of the lugs extending through one of the slots in the cowl and being releasably engaged with the retaining surface of one of the hook means whereby the windshield is releasably attached to the cowl, each lug being flexible by the camming surface of one of the hook means as the lugs are inserted through the slots until the opening in the lug passes the camming surface, the lateral dimension of each lug being reduced adjacent the bottom edge of the windshield whereby the windshield will fracture preferentially at the laterally reduced portions of the lugs when the windshield is forced forwardly.

3. In combination, a windshield and snowmobile cowl, the cowl having upper and lower surfaces and a plurality of spaced-apart slots extending therethrough, hook means on the cowl extending from the lower surface thereof below each slot in the cowl, each hook means having a camming surface extending below the associated slot and away from the lower surface of the cowl and a retaining surface extending angularly from the camming surface, the windshield having front and rear surfaces and a plurality of spaced-apart downwardly extending lugs, each lug being generally planar and having an opening therethrough and being flexible relative to the remainder of the windshield, each of the lugs extending through one of the slots in the cowl and being releasably engaged with the retaining surface of one of the hook means whereby the windshield is releasably attached to the cowl, each lug being flexible by the camming surface of one of the hook means as the lugs are inserted through the slots until the opening in the lug passes the camming surface.

4. The structure of claim 3 in which the retaining surface of each hook means extends substantially perpendicularly to the plane of the associated lug.

5. The structure of claim 3 in which the windshield has a lower edge extending between adjacent lugs and the upper surface of the cowl is provided with a groove extending between adjacent slots which receives the bottom edge of the windshield.

6. The structure of claim 3 in which the windshield has a lower edge extending between adjacent lugs and the upper surface of the cowl is provided with a groove extending between adjacent slots which receives the bottom edge of the windshield, the groove including a rear wall which abuts the rear surface of the windshield adjacent the lower edge of the windshield.

7. The structure of claim 3 in which the windshield and the lugs are integrally formed from resilient, flexible plastic.

* * * * *